United States Patent
Sadafale

(10) Patent No.: US 9,942,573 B2
(45) Date of Patent: Apr. 10, 2018

(54) SYSTEMS AND METHODS FOR REDUCING BLOCKING ARTIFACTS

(75) Inventor: Mangesh Devidas Sadafale, Nagpur (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 786 days.

(21) Appl. No.: 13/529,132

(22) Filed: Jun. 21, 2012

(65) Prior Publication Data

US 2012/0328028 A1 Dec. 27, 2012

(30) Foreign Application Priority Data

Jun. 22, 2011 (IN) .......................... 2120/CHE/2011

(51) Int. Cl.
*H04N 7/26* (2006.01)
*H04N 19/86* (2014.01)
*H04N 19/159* (2014.01)
*H04N 19/176* (2014.01)
*H04N 19/117* (2014.01)
*H04N 19/14* (2014.01)
*H04N 19/80* (2014.01)

(52) U.S. Cl.
CPC ........... *H04N 19/86* (2014.11); *H04N 19/117* (2014.11); *H04N 19/14* (2014.11); *H04N 19/159* (2014.11); *H04N 19/176* (2014.11); *H04N 19/80* (2014.11)

(58) Field of Classification Search
CPC .... H04N 19/159; H04N 19/176; H04N 19/86; H04N 19/14; H04N 19/80; H04N 19/117
USPC ...................................................... 375/240.24
See application file for complete search history.

(56) References Cited

U.S. PATENT DOCUMENTS

| | | | |
|---|---|---|---|
| 2004/0190626 A1* | 9/2004 | Sun et al. | 375/240.18 |
| 2006/0126962 A1* | 6/2006 | Sun | 382/268 |
| 2009/0304085 A1* | 12/2009 | Avadhanam et al. | 375/240.24 |
| 2010/0128803 A1* | 5/2010 | Divorra Escoda | H04N 19/159 375/240.29 |
| 2011/0032990 A1* | 2/2011 | Choi et al. | 375/240.13 |

\* cited by examiner

*Primary Examiner* — Zhihan Zhou
(74) *Attorney, Agent, or Firm* — Gregory J. Albin; Charles A. Brill; Frank D. Cimino

(57) ABSTRACT

Several methods and systems for reducing blocking artifacts are disclosed. In an embodiment, the method includes receiving a pair of adjacent blocks having an edge being positioned between the adjacent blocks. The pair of adjacent blocks is associated with one or more coding blocks. The one or more coding blocks comprise one or more coding information associated with the coding of the pair of adjacent blocks. The method also includes conducting a determination of whether the pair of adjacent blocks is coded in a skip-mode based on the one or more coding information. The edge is filtered based on the determination. Filtering the edge comprises disabling a de-blocking filtering of the edge based on a determination that the pair of adjacent blocks is coded in the skip-mode; and enabling the de-blocking filtering of the edge based on determination that the pair of adjacent blocks is not associated with the skip-mode.

25 Claims, 5 Drawing Sheets

SYSTEMS AND METHODS FOR REDUCING BLOCKING ARTIFACTS

CROSS REFERENCE TO RELATED APPLICATIONS

This application claims the benefit of Indian Provisional Patent Application No. 2120/CHE/2011, filed in the Indian Patent Office on Jun. 22, 2011, which is incorporated herein by reference in its entirety.

TECHNICAL FIELD

The present disclosure generally relates to the field of filtering multimedia data.

BACKGROUND

Pursuant to an exemplary scenario, multimedia data captured by media capture devices, such as a camera or a camcorder, may be compressed for saving memory during storage or for efficiently utilizing available bandwidth during a transmission. The multimedia data, for example video data, may be encoded utilizing encoding mechanisms that are sufficient to achieve compression of the video data. The video data may subsequently be decompressed (for example, decoded) for display/viewing purposes.

Moreover, in an exemplary scenario, various video coding paradigms suggest a block-based coding of video data, where each frame of video data is represented in terms of a plurality of blocks, and where coding techniques such as motion compensation and transformation are applied to the blocks so as to remove temporal and spatial redundancies in the frames corresponding to the video data. Pursuant to one exemplary scenario, visual distortions in content may sometimes be observed when viewing content corresponding to video data subjected to block-based coding. As a result of block-based coding of video data, a transition of content from one block to another may sometimes be affected, especially near edges of the blocks resulting in visual distortions. Such visual distortions, which may also be referred to as, for example, blocking artifacts, may reduce a perceptual quality of content corresponding to the video data.

SUMMARY

Various methods and systems for reducing blocking artifacts in block-based multimedia data are disclosed. In an embodiment, a method of reducing blocking artifacts includes receiving a pair of adjacent blocks having an edge being positioned between the adjacent blocks. The pair of adjacent blocks is associated with one or more coding blocks. The one or more coding blocks comprise one or more coding information associated with the coding of the pair of adjacent blocks. The method also includes conducting a determination, based on the one or more coding information, whether the pair of adjacent blocks is coded in a skip-mode. The edge between the pair of adjacent blocks is filtered based on the determination. The edge is filtered by performing one of: disabling a de-blocking filtering of the edge based on a determination that the pair of adjacent blocks is coded in the skip-mode; and enabling the de-blocking filtering of the edge based on a determination that the pair of adjacent blocks is not associated with the skip mode.

In one embodiment, a system configured to reduce blocking artifacts is disclosed. The system includes a processing module and a filtering module. The processing module is configured to receive a pair of adjacent blocks having an edge positioned between the adjacent blocks. The pair of adjacent blocks are associated with one or more coding blocks. The one or more coding blocks comprise one or more coding information associated with the coding of the pair of adjacent blocks. The processor is configured to conduct a determination, based on the one or more coding information, of whether the pair of adjacent blocks is coded in a skip-mode. The filtering module is communicatively associated with the processing module and is configured to filter the edge between the pair of adjacent blocks based on the determination. The filtering module is configured to perform one of: disabling a de-blocking filtering of the edge based on a determination that the pair of adjacent blocks is coded in the skip-mode; and enabling the de-blocking filtering of the edge based on a determination that the pair of adjacent blocks is not associated with the skip-mode.

In an embodiment, an integrated circuit configured to reduce blocking artifacts from block-based multimedia data is disclosed. The integrated circuit comprises coding module and a memory module. The coding module is configured to perform at least one of encoding of video data and decoding of encoded video data. The coding module comprises a processing module and a filtering module. The processing module is configured to receive a pair of adjacent blocks having an edge positioned between the adjacent blocks. The pair of adjacent blocks is associated with one or more coding blocks. The one or more coding blocks comprise one or more coding information associated with the coding of the pair of adjacent blocks. The processing module is further configured to conduct a determination, based on the one or more coding information, whether the pair of adjacent blocks is coded in a skip-mode. The filtering module is communicatively associated with the processing module and is configured to filter the edge between the pair of adjacent blocks based on the determination. The filtering module is configured to filter the edge by performing one of: disabling a de-blocking filtering of the edge based on a determination that the pair of adjacent blocks is associated with the skip-mode; and enabling the de-blocking filtering of the edge based on a determination that the pair of adjacent blocks is not associated with the skip-mode. The memory module is communicatively associated with the coding module and is configured to store the multimedia data subsequent to one of an encoding of the video data and a decoding of the multimedia data.

DETAILED DESCRIPTION

Pursuant to an exemplary scenario, several video processing standards utilize block-based coding techniques for facilitating data compression. The block-based coding techniques involve a division of multimedia data, such as video data, into a plurality of blocks (e.g., macro blocks). However, the division of video data into the blocks may result in the occurrence of blocking artifacts due to a lack of correlation between the blocks. The blocking artifacts include visible artifacts in a reconstructed video, wherein the visible artifacts correspond to one or more blocks used during prediction and residual signal coding processes. The blocking artifacts have a pronounced effect at low bit rates and cause blocking distortion, thereby affecting the quality of video data.

In one exemplary scenario, in order to reduce the occurrence of the blocking artifacts, de-blocking filters are employed during the encoding and decoding processes. The de-blocking filters are applied to edges positioned between adjacent blocks to reduce the blocking artifacts without reducing the sharpness of the video data, which results in an improvement of the subjective quality of video data. The de-blocking filters may be applied to vertical and/or horizontal edges associated with the blocks of the video data. An exemplary application of de-blocking filters during the encoding and decoding processes is explained herein with reference to FIGS. 1A and 1B.

Figure 1A:
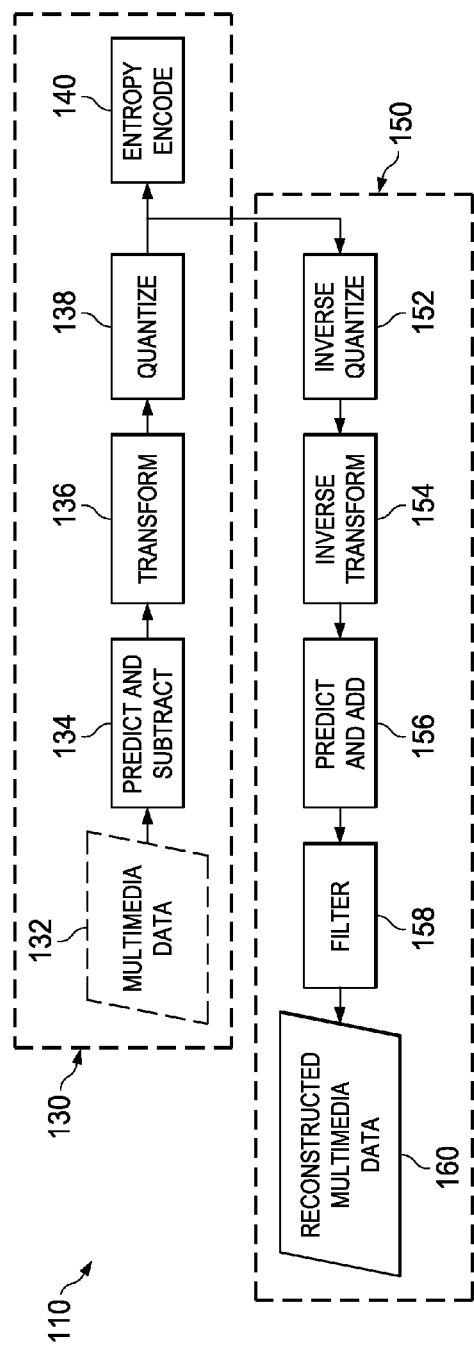
FIGS. 1A and 1B illustrate simplified overviews of exemplary encoding and decoding processes, respectively, in accordance with an exemplary scenario.
Figure 1B:
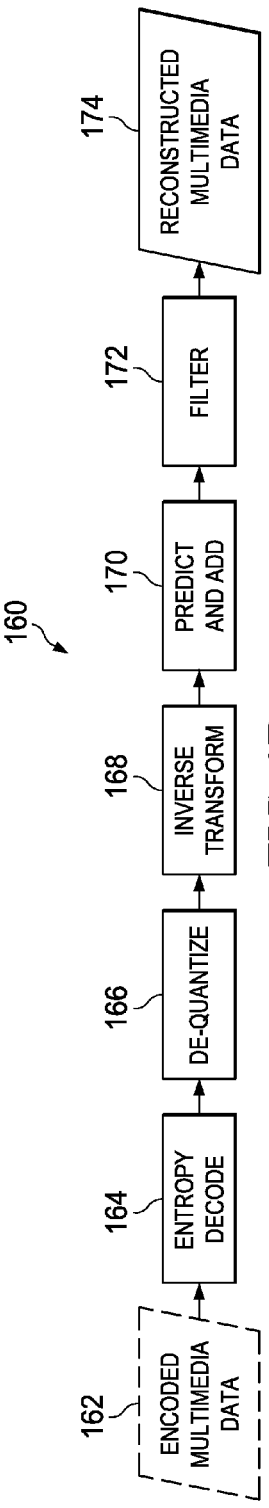

FIGS. 1A and 1B illustrate simplified overviews of exemplary processes for encoding and decoding multimedia data, respectively, which involve the application of a de-blocking filter, in accordance with an exemplary scenario. In particular, FIG. 1A illustrates a simplified overview of an encoding process flow 110 for encoding multimedia data. Pursuant to an exemplary scenario, a multimedia encoder may perform the encoding process flow 110 to achieve the compression of the multimedia data. An example of the multimedia data may be video data.

The multimedia encoder may be configured within a multimedia system. Examples of the multimedia system may include, but are not limited to, (1) multimedia devices, such as cellular phones, digital video cameras and digital camcorders; (2) data processing devices, such as personal computers, laptops and personal digital assistants; and (3) consumer electronics, such as set top boxes, digital video disk (DVD) players and video network servers. Pursuant to an exemplary scenario, the multimedia encoder may be any machine capable of executing a set of instructions (sequential and/or otherwise) so as to perform an encoding of multimedia data.

The multimedia encoding process flow 110 may include two data flow paths, namely, a forward path 130 and a reconstruction path 150. In the forward path 130, the multimedia data, such as the multimedia data 132, is transformed and quantized, while in the reconstruction path 150, the quantized coefficients associated with the multimedia data are decoded in order to reconstruct a frame for the encoding of additional blocks. The multimedia data 132 may be compressed so as to efficiently utilize a storage capacity during storage or a spectrum/bandwidth during transmission.

In the forward path 130, the multimedia data 132 may be received by the multimedia encoder from a media capture device. Examples of a media capture device may include a video camera or a camcorder. The media capture device may be, for example, a stand-alone device or a part of a mobile device, such as a Smartphone, or a data processing device, such as a personal computer, a laptop device or a personal digital assistant (PDA). The multimedia data 132 may also be received by the multimedia encoder from a transcoding system, which may be implemented, for example, in hardware, software and/or firmware, and which may be a stand-alone device or a part of a media capture device. Examples of multimedia data 132 may include, for example, video data, image data, audio-video data, graphical data, textual data or any combination thereof.

With reference still to FIG. 1A, at 134 of the forward path associated with the encoding process flow 130, a prediction for each block from among a number of blocks of multimedia data 132 is determined and subtracted from the block in order to form residual multimedia data. The prediction for each block of multimedia data 132 may be performed based on previously encoded blocks of multimedia data 132, either from current frame (e.g., intra prediction) or from other frames that have already been encoded and transmitted (e.g., inter prediction). Identifying a suitable inter-prediction may be referred to as motion estimation (ME) and subtracting the inter-prediction from the current block may be referred to as motion compensation (MC).

After prediction and subtraction, at 134, the residual multimedia data is transformed at 136. The transformation of the residual multimedia data outputs a set of transform coefficients, each of which is a weighting value for a standard basis pattern. The weighted basis patterns, when combined, are capable of recreating the residual multimedia data. At 138, the set of transform coefficients are then quantized (such as where each coefficient is scaled corresponding to a scale-down factor which may be a mathematical reciprocal of the scale-up factor specified by a preselected multimedia paradigm, effectively setting a number of transform coefficients to a small value (including a zero value)) to achieve compression.

The quantized transform coefficients, along with certain information (for example, information such as: information about the structure of compressed data, information about a complete sequence of multimedia data 132 and/or information that enables a decoder to re-create the prediction), are subject to entropy encoding (e.g., conversion into binary codes using variable length coding and/or arithmetic coding) at 140. The entropy encoding of the multimedia data 132 produces an efficient, compact binary representation of the information in the form of encoded multimedia data. The encoded multimedia data may then be stored and/or transmitted.

In the reconstruction path 150 associated with the encoding process flow 110, the quantized transform coefficients are decoded in order to reconstruct a frame for the purpose of encoding additional blocks. For example, at 152 and 154, the quantized transform coefficients are de-quantized and inverse transformed, respectively, in order to generate a difference block or a residual block. It is noted that the difference block (or the residual block) may not be identical to the original difference block since the quantization process is lossy, and therefore the difference block is a distorted version of the original encoded block of multimedia data. At 156, a prediction block is added to the difference block and the resulting multimedia block may be processed so as to block artifacts, as the resulting multimedia block is a distorted version of the original block. The effects of blocking distortion in the resulting multimedia block is reduced by applying a filter, for example, filter at 158, so as to generate reconstructed multimedia data at 160. The reconstructed multimedia data 160 may be saved in a storage unit (e.g., a frame memory) or subsequently utilized for prediction.

FIG. 1B illustrates a simplified overview of a decoding process flow 160 for decoding encoded multimedia data 162. Pursuant to an exemplary scenario, a multimedia decoder may perform the decoding process flow 160 to achieve the decompression of the multimedia data 132. The multimedia decoder may be configured within a multimedia system, such as the multimedia system of FIG. 1A. At 164, the encoded multimedia data 162 may be entropy decoded (e.g., converted from the binary form, first into intermediate symbols and thereafter into quantized transform coefficients along with the decoding of other encoded information). At 166, the quantized transform coefficients may be de-quantized (e.g., scaled corresponding to a scale-up factor, which may be, in an exemplary embodiment, a value specified by a preselected multimedia paradigm) and then inversely transformed at 168 to obtain the residual multimedia data. At 170, the residual multimedia data may be added to (e.g., combined with) predicted blocks configured from the other information that is decoded along with the quantized transform coefficients in order to create the blocks of multimedia data.

As disclosed herein, in the block-based coding (described with reference to FIGS. 1A and 1B), the multimedia data 132 is fragmented into blocks which in turn are transformed and quantized separately, thereby leading to many discontinuities occurring at the edges between adjacent blocks. In addition, prediction of motion-compensated blocks may contribute to further enhancement of these discontinuities as the motion vectors (MVs) for prediction may be associated with different reference frames. These MVs may not provide a perfect match and therefore may propagate the discontinuities from the reference frame throughout multimedia data. These effects are commonly known as blocking artifacts, which can be quite visible and may lower the quality of the decompressed multimedia data. In order to counter blocking artifacts, a filter, for example, a filter 172 is deployed towards the end of the reconstruction path. The blocks of the resulting multimedia data obtained at the output of predict and add block 170 may be filtered by the filter 172 so as to generate reconstructed blocks of multimedia data 174. The filter 172 is configured to smooth the transition between two adjacent blocks of the resulting multimedia data, and thus reduce the visual disturbance created by the artifacts.

In particular, the de-blocking filtering is performed to each decoded block from among a plurality of decoded blocks in order to reduce the distortion. For example, as illustrated in FIG. 1A, in an encoder, the de-blocking filtering is performed after the inverse transform and before reconstructing and storing the block. Also, as illustrated in FIG. 1B, in the decoder, the de-blocking filtering is performed before reconstructing and displaying the block. As used herein, performing de-blocking filtering implies performing de-blocking filtering to the horizontal and vertical edges or boundaries of the blocks. Each de-blocking filtering operation may affect three pixels on either side of the boundary. As used herein, the term 'edge' or the 'boundary' may have the same meaning as the term 'margin' or 'periphery' of the adjacent blocks such that the pair of adjacent blocks may comprise an edge or a boundary disposed in-between the adjacent blocks. The edge may be a vertical edge or a horizontal edge. An exemplary vertical edge and a horizontal edge disposed in-between a pair of adjacent blocks is illustrated with reference to FIGS. 2A and 2B, respectively.

Figure 2A:
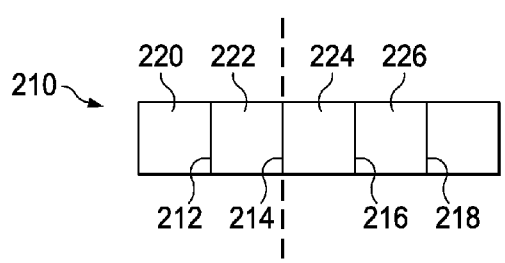
FIGS. 2A and 2B illustrate a vertical edge and a horizontal edge, respectively, associated with exemplary block-coded multimedia data in accordance with an exemplary scenario.
Figure 2B:
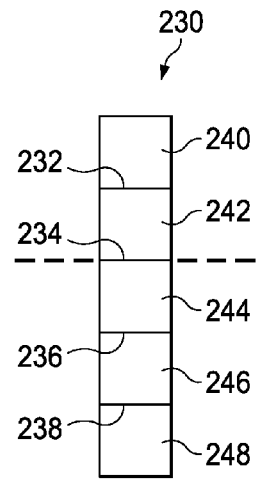

FIGS. 2A and 2B illustrate edges, for example a horizontal edge and a vertical edge disposed in-between a pair of blocks in accordance with an exemplary embodiment. FIG. 2A illustrate a first plurality of blocks 210 having edges 212, 214, 216, 218 disposed in-between adjacent blocks, such as blocks 220 and 222, 222 and 224, 224 and 226, and 226 and 228, respectively. The edges 212, 214, 216, 218, as represented in FIG. 2A, are vertical edges. Referring now to FIG. 2B, a second plurality of blocks 230 having edges 232, 234, 236, 238 between the adjacent pairs of blocks, such as blocks 240 and 242, 242 and 244, 244 and 246, and 246 and 248, respectively. The edges 232, 234, 236, 238, as represented in FIG. 2B, are horizontal edges.

In block-based encoding, the de-blocking filtering is performed at the vertical edges and the horizontal edges of the blocks. The de-blocking may be performed by computing a boundary strength (BS) parameter associated with each of the edges. The BS parameter is indicative of an extent of de-blocking filtering to be performed to that edge. For example, the BS parameter may assume one of five values ranging from 0 to 4, which are indicative of different edge conditions associated with that edge. Particularly, a value of BS as 4 indicates a strongest de-blocking filtering condition/mode while a value of zero is indicative of an absence of de-blocking filtering. It is noted that the term "boundary strength" as used herein, may be construed, for example, as referring to strength of an edge between a pair of adjacent blocks and is a numerical value computed based on an encoding mode of the adjacent blocks associated with the edge and encoding data associated with the adjacent blocks. The encoding mode may include an intra prediction mode, an inter prediction mode or a skip-mode.

It should be noted that preselected multimedia paradigms, for example, video coding paradigms, provide specifications for implementation of the process flow for de-blocking filtering. One such exemplary implementation of a de-blocking process flow, as suggested by certain exemplary multimedia coding paradigms, and a corresponding process flow implementation are outlined in FIG. 3.

Figure 3:
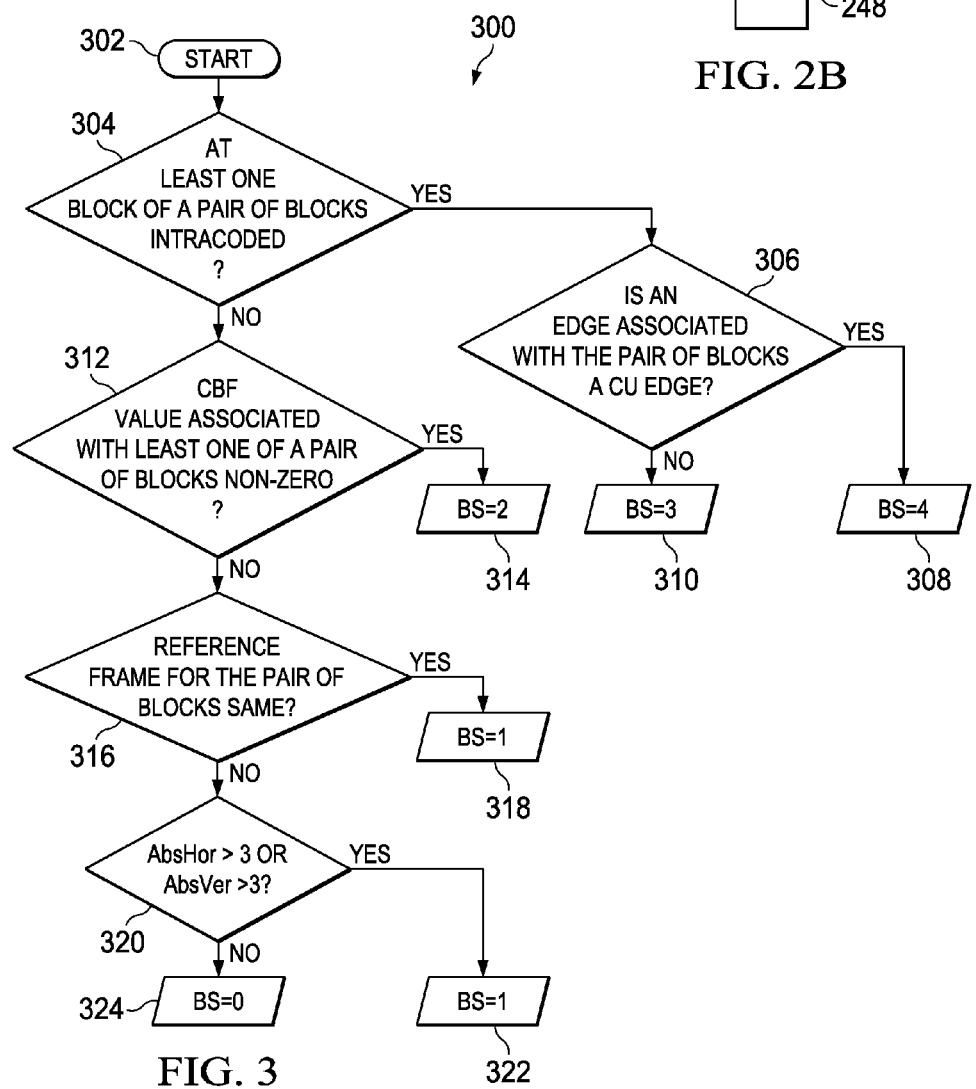
FIG. 3 is an exemplary process flow implementation for reducing blocking artifacts in multimedia data in accordance with an exemplary embodiment.

FIG. 3 is an exemplary process flow implementation of a method 300 for reducing blocking artifacts in multimedia data in accordance with an exemplary embodiment. The method 300 includes performing de-blocking filtering by determining a value of a BS parameter associated with edges between pairs of adjacent blocks in multimedia data, and filtering the edges based on the value of the BS parameter. The method 300 is equally applicable to the computation of the value of the BS parameter associated with a vertical edge and a horizontal edge disposed in-between a pair of adjacent blocks. The method 300 can be implemented by a multimedia encoder/decoder, such as a multimedia encoder/decoder 110, 160 (explained in FIGS. 1A/1B, respectively) that is based on a block-based multimedia coding standard.

In an embodiment, and pursuant to a block-based multimedia coding standard, such as ITU-T H.264 standard, a frame is divided into coding blocks. The coding blocks may be referred to as "macroblocks (MBs)". The ITU-T H.264 standard supports MBs of sizes 16×16 pixels. In an embodiment, for each coding block in the frame, a prediction block is determined that may match with the coding block based on motion estimation. The 'prediction block' in ITU-T H.264 standard can be of 16×16, 16×8, 8×16, 8×8, 8×4, 4×8 and 4×4 pixels. The prediction block may be coded by transformation and quantization. The transformation of a block coverts the pixel value of the block from spatial domain into a frequency domain to generate transform block. The transform block in ITU-T H.264 standard can have a size of be of 8×8 pixels to 4×4 pixels.

Additionally, in other embodiment, and pursuant to block-based multimedia coding standard, such as HEVC standard, a frame is represented by a block hierarchy comprising a coding block, a prediction block and a transformation block. For example, in HEVC standard implementation, the coding block, the prediction block and the transform block comprises a coding unit (CU), a prediction unit (PU) and a transform unit (TU), respectively. Herein, when the size of a largest coding unit (LCU) and the hierarchical depth of CU are defined, the overall coding structure may be characterized by the various sizes of CU, PU and TU in a recursive manner. The LCU is the base unit for block-based coding. The size of LCU may be, for example, 32×32, 64×64, and the like. The CU is the basic coding unit inside the LCU and can have various sizes. For a size and hierarchical depth of the LCU, the CU can be expressed in a recursive quadtree representation adapted to the frame. For any size of the CU, a series of split flags is used to specify smaller size CUs (SCU) inside the CU. For every CU that does not further split, TU quadtree and PU partition information is specified. and TUs. The size of a TU and PU cannot be larger than that of a CU and they are independent of each other. The size of the TU may be, for example, 4×4, 8×8, 16×16, 32×32, 32×16, 16×32, 16×8, 8×16. The size of the PU may be, for example 8×8, 16×8, 8×16, 16×16, 32×16, 16×32, 32×32. In order to perform the de-blocking filtering, vertical edges and horizontal edges of each PU and TU are de-blocked.

The method 300 for performing de-blocking filtering starts at 302, wherein the pair of adjacent blocks associated with block-coded multimedia data is received. The pair of adjacent blocks includes an edge positioned there between (for example, one of a vertical edge or a horizontal edge as illustrated and explained with reference to FIGS. 2A and 2B, respectively). At 304, a determination is made as to whether at least one of the blocks from among the pair of adjacent blocks is intra-coded. If it is determined that either of the pair of blocks is intra-coded, then a further determination is made at 306 as to whether the edge disposed between the blocks from among the pair of blocks is an edge of a coding block. In an embodiment, the coding block may be a macro-block, for example, in case of H.264 standard implementation. In another embodiment, the coding block may be a CU, for example, in case of HEVC standard implementation. If the edge is determined to be the edge of the CU, then the BS parameter associated with the edge is assigned a value of 4, at 308. Alternatively, the BS parameter associated with the edge is assigned a value of 3, at 310. It is noted that the de-blocking filtering is maintained stronger at edges containing a significant amount of blocking distortion, such as an edge between adjacent intra-coded blocks and between adjacent blocks containing coded coefficients.

Upon determining at 304 that neither of the blocks from among the pair of adjacent blocks is intra-coded, the values of code block flag (CBF) parameter associated with the pair of adjacent blocks are determined. Particularly, it is determined (at 312) whether the CBF parameters of at least one of the pair of blocks are non-zero. Upon determining the CBF parameter of the at least one of the pair of blocks to be non-zero, the BS parameter associated with the edge is assigned a value of 2 at 314. If, however, the CBF parameters of both the blocks from among the pair of adjacent blocks are determined to be zero, then it is determined (at 316) whether the reference frame associated with both blocks of the pair of adjacent blocks are the same. Upon determining that the reference frames associated with the pair of adjacent blocks are the same, the BS value associated with the edge is assigned a value of one at 318, thereby allowing a weak de-blocking filtering.

If, however, the reference frames for both of the blocks from among the pair of adjacent blocks are determined to be different, then the BS value assigned to the edge is determined based on a difference between two or more unfiltered pixel values of adjacent pixels across the horizontal edge and the vertical edge. In particular, upon the determination that the difference between two or more unfiltered pixel values of adjacent pixels across the horizontal edge and the vertical edge is greater than a threshold value (for example, 3), the edge is assigned a BS parameter value of 1, and the de-blocking filtering of the edge is performed accordingly. Alternatively, if the difference between two or more unfiltered pixel values of adjacent pixels across the horizontal edge and the vertical edge is not determined to be greater than the threshold value, then the edge is assigned a BS parameter value of zero. The BS value of zero corresponds to a skip-mode, wherein the de-blocking filtering of the edge is skipped. In particular, the de-blocking filtering is not applied to the corresponding edge upon the determination that the edge is coded in the skip-mode.

As discussed herein with reference to FIG. 3, the method 300 for the determination of the BS parameter to perform de-blocking filtering of an edge includes a computation of various coding parameter values, such as intra-coded blocks, a CBF parameter, a reference frame determination, a motion vector determination, and the like, associated with the pair of adjacent blocks. Also, a degree of de-blocking filtering to be applied is determined based on the determination of the coding parameter values. It is noted that the computation/determination of the coding parameters associated with the blocks may involve complex calculations. Various embodiments of the present technology provide methods and systems that may be applied to efficiently determine the de-blocking filtering without performing complex calculations. Various embodiments of the present disclosure are herein disclosed with reference to FIGS. 4 to 7.

The following description and accompanying figures demonstrate that the present technology may be practiced or otherwise implemented in a variety of different embodiments. It should be noted, however, that the scope of the present technology is not limited to any or all of the embodiments disclosed herein. Indeed, one or more of the devices, features, operations, processes, characteristics, or other qualities of a disclosed embodiment may be removed, replaced, supplemented, or changed.

Figure 4:
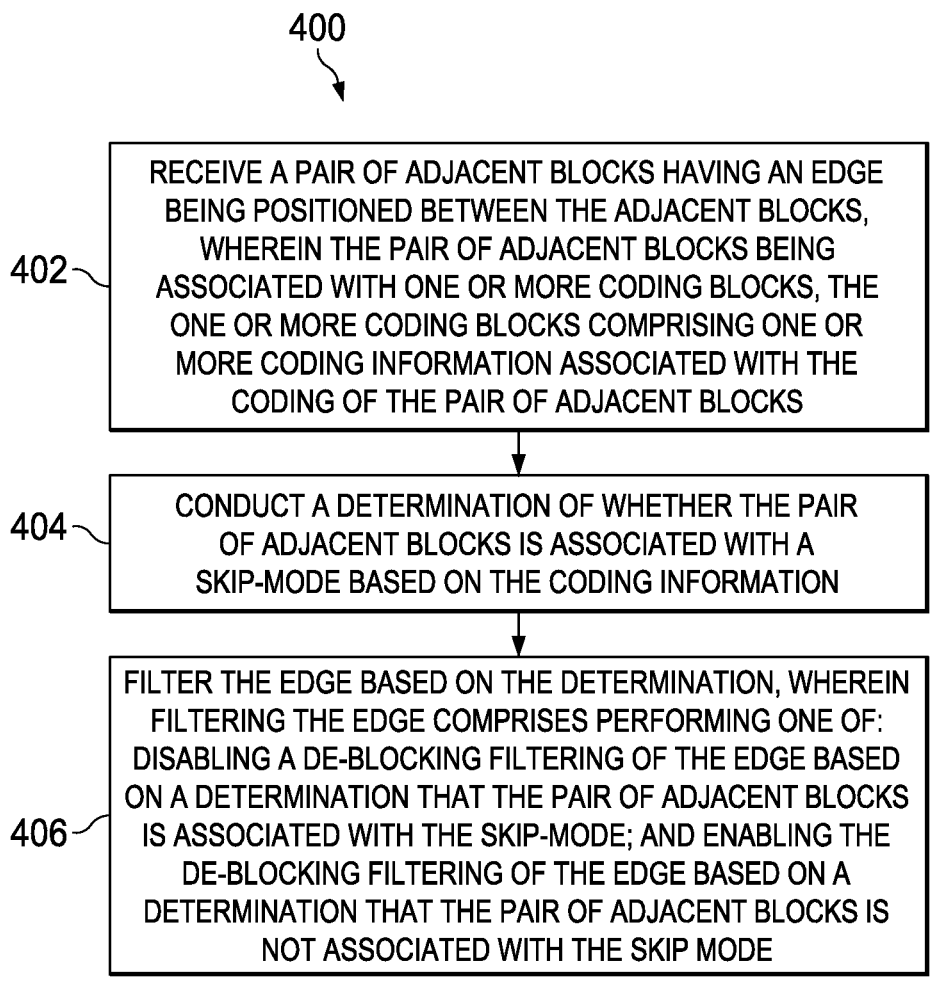
FIG. 4 is a flow diagram of an exemplary method of reducing blocking artifacts in multimedia data in accordance with an embodiment.

FIG. 4 illustrates a flow diagram of a method 400 of reducing blocking artifacts in multimedia data according to an embodiment. In an embodiment, the method 400 may be computer-implemented. In an embodiment, the blocking artifacts may be reduced by performing a de-blocking filtering at the edges of the blocks associated with the multimedia data. In an embodiment, the edges (or boundaries) where the de-blocking filtering is performed may be one of a vertical edge or a horizontal edge. The vertical edges and the horizontal edges between the pair of blocks are explained with respect to FIGS. 2A and 2B.

At operation 402, a pair of adjacent blocks associated with a block-coded multimedia data is received. The pair of adjacent blocks comprises an edge positioned there-between. In an embodiment, the pair of adjacent blocks is associated with one or more coding blocks. In an embodiment, the one or more coding blocks may include one or more macro-blocks, for example, in case of H.264 standard implementation. In another embodiment, the one or more coding blocks may include one or more CUs, for example, in case of HEVC standard implementation. In an embodiment, the one or more coding block comprises one or more coding information associated with the pair of adjacent blocks.

In an embodiment, each block of the pair of adjacent blocks may includes one of a transform block and a prediction block. For example, for ITU H.264 standard implementation, each block of the pair of adjacent blocks includes one of a prediction block and a transform block. In another example, such as for HEVC standard implementation, each of the pair of adjacent blocks includes one of a PU and a TU.

In an embodiment, the pair of adjacent blocks comprises encoded multimedia data and may be received upon the encoding of multimedia data received by an encoder (such as explained herein with reference to FIG. 1A). In one embodiment, the pair of adjacent blocks may be received in a decoder after the encoded multimedia data is reconstructed from the predicted multimedia data (such as explained herein with reference to FIG. 1B). In an embodiment, during encoding of the multimedia data, the blocks may be inter-coded by using motion-compensated prediction from one or more previously encoded video frames or intra-coded without a prediction from any other frame. After the encoding, many inter-coded blocks may have zero motion vectors (MVs) and/or quantized coefficients. A block with a zero MV and all zero quantized coefficients can be 'skipped' such that no coded data is transmitted for the block. Such blocks may be transmitted as 'skip-mode' blocks. The term 'skip-mode' for a block, as used herein, may be defined as a block for which no other information is coded other than an indication that the block is decoded as 'skipped'. A block that is coded as skipped may be referred to as a 'skipped block'. In an embodiment, the coded information indicating the mode of a block as a skip-mode may include merely a single bit of information.

In an exemplary embodiment, a significant number of inter-coded blocks associated with the multimedia data may tend to be skipped because of low/medium activity associated with the multimedia data. For example, for multimedia content representing a video conferencing that may comprise various blocks that may be skipped, the video conferencing related multimedia content comprises low/medium activity. Other examples of the multimedia content may include, but are not limited to, video surveillance data, videos showing news reading, and the like. In an embodiment, the blocks that may be skipped with little or no distortion may not be coded, thereby resulting in a substantial computational savings without significantly affecting the rate of distortion performance.

At operation 404, a determination is conducted, based on the one or more coding information, that whether the pair of adjacent blocks are coded in a skip-mode. In an embodiment, for ascertaining whether the blocks are coded as a skip-mode block, the one or more coding information transmitting along with the coding block is accessed. A block coded in a skip-mode may be skipped during the encoding of the multimedia data.

At operation 406, an edge positioned in-between the pair of adjacent blocks is filtered based on the determination. In an embodiment, the pair of adjacent blocks is filtered by disabling a de-blocking filtering of the edge based on the determination that the pair of adjacent blocks is associated with the skip-mode. In an embodiment, the de-blocking filtering of the edge may be disabled by assigning a zero value to a BS parameter associated with the edge.

In one embodiment, the pair of adjacent blocks is filtered by performing the de-blocking filtering of the edge based on a determination that the pair of adjacent blocks is not associated with the skip-mode. In an embodiment, the de-blocking filtering of the edge is performed on determining coding parameters associated with the pair of adjacent blocks. In an embodiment, the coding parameters includes at least one of a residual data, a motion estimation data and a data associated with one or more reference pictures corresponding to the blocks. In an embodiment, a BS parameter may be assigned to the edge based on the coding parameters. The assignment of the BS parameter to the edge based on the coding parameters is explained in further detail herein with reference to FIG. 5. In an embodiment, the de-blocking filtering of the edge is performed based on the value of the BS parameter assigned thereto. In an embodiment, the BS parameter may assume either of five values ranging from zero to four, wherein the value of zero indicates that no de-blocking filtering is to be performed while the value of 4 is associated with a maximum de-blocking filtering.

As discussed herein, the determination of the skip-mode coding associated with a pair of adjacent block enables the avoidance of complex computations that might otherwise be performed before ascertaining the disabling of the de-blocking filtering of the block (see, e.g., FIG. 3). For example, referring to FIG. 3, the computations associated with operations 312-322 may be avoided if it is determined in the beginning that the block under consideration is coded in a skip-mode. Moreover, an access to the memory in order to read a reference picture index (at operation 316) and motion vector (at operation 320) may be avoided if the pair of adjacent blocks is determined to be coded in the skip-mode.

Figure 5:
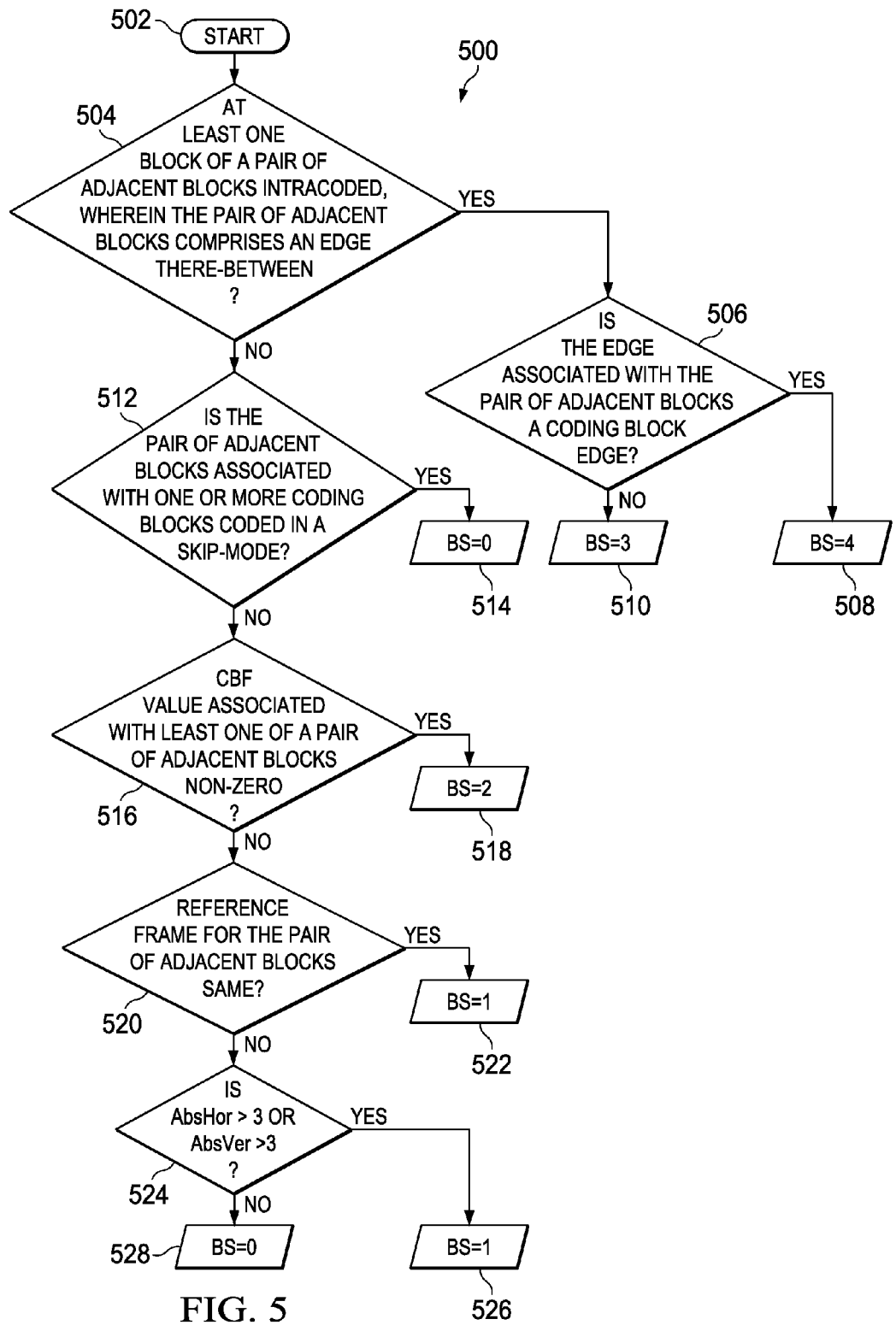
FIG. 5 illustrates a variation in an exemplary process flow implementation for reducing blocking artifacts in multimedia data in accordance with an embodiment.

FIG. 5 illustrates an exemplary flow diagram for a method 500 of removing blocking artifacts from multimedia data according to an embodiment. In an embodiment, for each edge between a pair of blocks, a BS parameter is determined, and, based on the value of the BS parameter, a de-blocking filtering of the edge is performed in order to reduce/remove de-blocking artifacts. In an embodiment, the edge may be a boundary that may be common between the adjacent pair of blocks. The determination of the BS parameter is based on various parameters associated with the encoding of the blocks of the multimedia data. In an embodiment, the edges may be assigned either of five values ranging from zero to four, wherein the value of zero indicates that no filtering is to be implemented while the value of 4 is associated with a strongest filtering.

At operation 502, the method 500 of reducing blocking artifacts in encoded multimedia data is initiated. In an embodiment, the encoded multimedia data may include a plurality of blocks, wherein an edge is positioned between adjacent blocks from among the plurality of blocks. In an embodiment, each block of the pair of adjacent blocks may be one of a prediction block and a transform block. More specifically, the pair of adjacent blocks may represent a prediction block and a transform block, or a pair of transform blocks or a pair of prediction blocks. Additionally, the prediction block and the transform block may represent basic units of prediction and transformation, respectively, as per one or more video coding paradigms including, for example, H.264 coding paradigm, HEVC paradigm, and the like.

In an embodiment, the pair of adjacent blocks may include a vertical edge or a horizontal edge positioned there between (such as, as explained herein with reference to FIGS. 2A and 2B). In an embodiment, a de-blocking filter is configured to execute the filtering of the edge in order to reduce blocking artifacts associated with the edge. In an embodiment, the pair of adjacent blocks is associated with one or more coding blocks. In an embodiment, the one or more coding blocks may be macro-blocks, for example, in case of H.264 standard implementation. In another embodiment, the one or more coding blocks may be CUs, for example, in case of HEVC standard implementation. In an embodiment, the one or more coding blocks comprise one or more coding information associated with the pair of adjacent blocks.

In an exemplary embodiment, the size of the block may be specified by a variable log 2BlockSize. Also, it may be assumed that (xEk, yEj) defines a set of edge locations associated with a frame or a picture of the multimedia data, wherein k=0 . . . nE−1, and
j=0 . . . nE−1, and wherein
nE is set equal to 1 (1<<log 2BlockSize)>>2),
xE0=0,
yE0=0,
xEk+1=xEk+4, and
yEj+1+yEj+4.

At operation 504, it is determined whether at least one block of the pair of adjacent blocks intra-coded. If it is determined that either of the blocks of the pair of adjacent blocks is intra-coded, then it is further determined at 506 whether the edge is associated with a coding block edge. If it is determined at operation 506 that the edge is also the coding block edge, then at operation 508 the value of the BS for the edge is determined to be 4. Alternatively, upon the determination at operation 506 that the edge is not the coding block edge, at operation 508 the value of the BS parameter for the edge is determined to be 3. It is noted that a BS value of 3 or 4 is associated with a strong de-blocking filtering.

In an embodiment, the determination (at operation 506) of whether the edge is also the coding block edge may be performed as follows:

If horEdgeFlags[xEk][yEj]=1,
then set
p0=recPicture[xC+xEk][yC+yEj−1] and
q0=recPicture[xC+xEk][yC+yEj].
filterDir=1
Else if
verEdgeFlags[xEk][yEj]=1
then Set
p0=recPicture[xC+xEk−1][yC+yEj] and
q0=recPicture[xC+xEk][yC+yEj].
filterDir=0.
  where, horEdgeFlags and verEdgeFlags represent the horizontal edge flag and the vertical edge flag, respectively, associated with the edge,
  p0 and q0 represent the adjacent blocks, and
  filterDir is a variable.

Depending on the value of the variable filterDir, the variable bS[filterDir][xEk][yEj] may be derived. The variable bS[filterDir][xEk][yEj] is indicative of the value of the BS parameter based on the value of the variable filterDir. For example, at block 508, the variable bS[0][xEk][yEj] is set equal to 4. The value of 4 being assigned to the variable bS[0][xEk][yEj] indicates that the adjacent blocks p0 or q0 are associated with a coding block coded with intra-prediction mode and that the edge is also a coding block edge. If, however, the adjacent blocks (for example, blocks p0 or q0) are associated with a coding block coded with intra-prediction mode, but the edge is not the coding block edge, then the variable bS[filterDir][xEk][yEj] is set equal to 3.

At operation 504, if it is determined that neither of the blocks from among the pair of adjacent blocks is intra-coded, then, at operation 512, it is determined whether the pair of blocks is associated with one or more coding blocks coded in a skip-mode. If it is determined at operation 512 that the pair of blocks is associated with one or more coding blocks coded in the skip-mode, then the BS parameter for the edge is assigned a value of 0. In an embodiment, the BS parameter is assigned a value of 0 by making the variable bS[filterDir][xEk][yEj] equal to 0. In an embodiment, the assignment of a value of 0 to the BS parameter indicates that the blocks (p0 or q0) of the pair of adjacent blocks are associated with the coding blocks coded with the skip-mode.

In an embodiment, if at operation 512, it is determined that the blocks from among the pair of adjacent blocks are not associated with one or more coding blocks coded with the skip-mode, then the process for reducing blocking artifacts may be performed in a manner similar to the method 300 explained herein with reference to FIG. 3. In particular, the operations 516-528 may be performed in a manner similar to the operations 312-324 of the method 300. For example, it is determined at operation 516 whether or not the CBF parameter associated with the pair of adjacent blocks (p0 and q0) is non-zero. If it is determined that the CBF parameter associated with the pair of adjacent blocks (p0 and q0) are non-zero, then, at operation 518, the BS parameter is assigned a value of 2. In an embodiment, the BS parameter is assigned a value of 2 by making the variable bS[filterDir][xEk][yEj] equal to 2. In an embodiment, the assignment of a value of 2 to the BS parameter may indicate that at least one of the blocks (p0 or q0) from among the pair of adjacent blocks is in a TU that contains a non-zero transform coefficient level.

If it is determined at block 516 that the CBF parameter associated with at least one of the blocks from among the pair of adjacent blocks is zero, then various coding parameters associated with the coding of blocks of the pair of adjacent blocks may be determined, and the edge may be selectively assigned BS values based on the determination of the coding parameters. For example, the BS parameter may be assigned a values of 1 based on the determination of various coding parameters including, but not limited to, a reference image index, motion vectors, and the like. For example, in one embodiment, it is determined at operation 520, that whether the PU comprising the block p0 has the same reference picture as the PU comprising the block q0. If it is determined that the reference picture used for predicting the block p0 and the block q0 are the same, then the BS parameter may be assigned a value of 1. If, however, it is determined at operation 520 that the reference picture used for predicting the block p0 and the block q0 are not same, then, at operation 524, an absolute difference of horizontal components (AbsHor) and an absolute difference of vertical components (AbsVer) associated with the motion vectors used for predicting the PU containing the blocks p0 and q0 may be determined. If it is determined at operation 524 that either of the AbsHor and AbsVer is greater than or equal to 4 in units of luminance samples, then the BS parameter may be assigned a value of 1 at operation 526. Otherwise, if it is determined at operation 524 that neither of the AbsHor and AbsVer is greater than or equal to 4 in units of luminance samples, then the BS parameter may be assigned a value of 0 at operation 528. In an embodiment, the BS parameter is assigned a value of 0 by making the variable bS[filterDir][xEk][yEj] is equal to 0.

In an embodiment, the method 500 represents a variation in an exemplary method (such as discussed herein with reference to FIG. 3) for reduction of de-blocking artifacts of multimedia data. As will be noted, the blocks 502-508 and 516-528 outline an exemplary process implementation for reduction of blocking artifacts by performing de-blocking filtering, whereas blocks 512-514 outline variations in a process of performing de-blocking filtering of the multimedia data to thereby remove blocking artifacts from the multimedia data. An exemplary system configured to implement the method flow outlined in the flow diagram 500 for reducing blocking artifacts is provided in FIG. 6.

Figure 6:
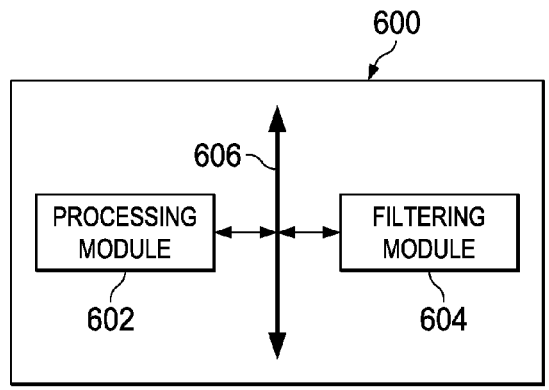
FIG. 6 is a block diagram of an exemplary system for reducing blocking artifacts in multimedia data according to an embodiment.

FIG. 6 is a block diagram of a system 600 for reducing blocking artifacts of multimedia data, for example, a block-coded multimedia data according to an embodiment. In an embodiment, a multimedia data may be processed to generate the block-coded multimedia data, such as explained herein with reference to FIGS. 1A and 1B. Examples of multimedia data may include video data, image data, audio-video data, graphical data, textual data, or any combinations thereof. The blocking artifacts may be reduced by de-blocking filtering of the block-coded multimedia data. The visual quality of the block-coded multimedia data is improved by performing de-blocking filtering which is responsible for reducing visually disturbing blocking artifacts and discontinuities in a frame that may occur due to coarse quantization of blocks and motion-compensated prediction.

In an embodiment, the system 600 is configured to be included in a multimedia encoder/decoder. In one embodiment, the system 600 is a high efficiency video coding (HEVC) based video encoder. In one embodiment, the system 600 is one of a moving picture experts group (MPEG)-1 based video decoder, MPEG-2 based video encoder and MPEG-4 based video encoder. In one embodiment, the system 600 is a HEVC based video decoder. In one embodiment, the system 600 is one of a MPEG-1 based video decoder, MPEG-2 based video decoder and MPEG-4 based video decoder. In one embodiment, the system 600 is a HEVC based video encoder. In one embodiment, the system 600 is one of a MPEG-1 based video encoder, MPEG-2 based video encoder and MPEG-4 based video encoder. In an embodiment, the system 600 may be a stand-alone device or configured within a multimedia system. Examples of such multimedia systems may include, but are not limited to, (1) multimedia devices, such as cellular phones, digital video cameras and digital camcorders; (2) data processing devices, such as personal computers, laptops and personal digital assistants; and (3) consumer electronics, such as set top boxes, digital video disk (DVD) players and video network servers.

The system 600 is depicted to include a processing module 602 and a filtering module 604. In an embodiment, the processing module 602 and the filtering module 604 are configured to communicate with each other via or through a bus 606. Examples of the bus 606 may include, but are not limited to, a data bus, an address bus, a control bus, and the like. The bus 606 may be, for example, a serial bus, a bi-directional bus or a unidirectional bus. In an embodiment, the filtering module 604 is configured to filter edges positioned between adjacent blocks of the video data. In an embodiment, filtering the edge may involve modifying pixel values of pixels on one side or either side of the edge in order to smooth out a difference in pixel values to thereby reduce the occurrence of blocking artifacts (for example, visual distortions in displayed video data). Exemplary edges between a pair of adjacent blocks are illustrated in FIGS. 2A and 2B.

The processing module 602 may be configured to receive the block-coded multimedia data. In an embodiment, the block-coded multimedia data may include blocks of data such that a pair of adjacent blocks may comprise an edge positioned therebetween. In an embodiment, the block-coded multimedia data may be received by the processing module 602 from an encoder associated with a multimedia system and/or transcoding systems, such as, for example, a stand-alone device or a part of a mobile device, such as a Smartphone, or a data processing device, such as a personal computer, a laptop device or a personal digital assistant (PDA). In an embodiment, the blocks of the pair of adjacent blocks may be one of a prediction block and a transform block. More specifically, the pair of adjacent blocks may represent a prediction block and a transform block, or a pair of transform blocks or a pair of prediction blocks. Additionally, the prediction block and the transform block may represent basic units of prediction and transformation, respectively, as per one or more video coding paradigms including, for example, H.264 coding paradigm, HEVC paradigm, and the like.

In an embodiment, the processing module 602 is configured to determine whether the blocks from among a pair of adjacent blocks are intra-coded. Upon the determination by the processing module 602 that at least one of the pair of adjacent blocks is not intra-coded, the processing module 602 is further configured to determine whether the pair of adjacent blocks are associated with one or more coding blocks coded in a skip-mode. As described herein, a block coded in a skip-mode is skipped from the de-blocking filtering operation during the decoding of the multimedia data. In an embodiment, the blocks that may be skipped with little or no distortion are not decoded, thereby resulting in a substantial computational savings in the system.

The filtering module 606 is communicatively associated or coupled with the processing module 604. In an embodiment, the filtering module 606 is configured to filter an edge between the pair of adjacent blocks based on the determination of the pair of adjacent blocks being associated with one or more coding units coded in the skip-mode. For example, in an embodiment, the filtering module 604 is configured to disable the de-blocking filtering of the edge based on the determination of the pair of adjacent blocks are associated with one or more coding units coded in the skip-mode. In an embodiment, the filtering module 604 is configured to perform a disabling of the de-blocking filtering of the edge by assigning a zero value to a BS parameter associated with the edge. It is noted that the term "boundary strength" as used herein, may be construed, for example, as referring to the strength of an edge between a pair of adjacent blocks and is a numerical value computed based on an encoding mode of the adjacent blocks associated with the edge and encoding data associated with the adjacent blocks.

The foregoing notwithstanding, in one embodiment, the processing module 602 is configured to determine that the pair of adjacent blocks are intra-coded. In an embodiment, upon determining that either of the pair of blocks is intra-coded, the processing module 602 is further configured to determine whether the edge positioned between the blocks from among the pair of blocks is associated with one or more coding units coded in the skip mode. The processing module 602 is further configured to assign a value of 3 or 4 to the BS parameter based on the determination that the edge is associated with the coding unit. A value of 3 or 4 being assigned to the BS parameter is indicative of a strong de-blocking filtering. It is noted that the performance of the de-blocking filtering is maintained stronger at edges containing a significant amount of blocking distortion, such as an edge between adjacent intra-coded blocks and between adjacent blocks containing coded coefficients.

In an embodiment, the filtering module 604 is configured to enable the de-blocking filtering by determining coding parameters associated with the pair of adjacent blocks and assigning a value to a BS parameter associated with the block edge based on the coding parameters. In an embodiment, the coding parameters includes at least one of residual data, motion estimation data and data associated with one or more reference pictures corresponding to the blocks (such as discussed herein with reference to FIGS. 4 and 5).

In an embodiment, the processing module 602 is further configured to determine whether at least one block from among a pair of adjacent blocks is coded in a skip-mode. Based on the determination by the processing module 602 that the block is coded in the skip-mode, the filtering module 606 is configured to disable the de-blocking filtering from each of the internal edges of the block based on the assignment of the zero BS parameter value to the block. As an example, consider the block to be a CU of size 16×16 that may include two TUs of size 8×8. The de-blocking filtering of the CU may involve a de-blocking filtering of four edges associated with the two TUs inside the CU. However, when the processing module 602 determines that the CU is coded in a skip-mode, then the filtering module 604 may disable the de-blocking filtering from each of the four edges associated with the TUs inside the CU. The disabling of the de-blocking filtering from the internal edges of the CU based on the determination of the mode of CU as a skip-mode facilitates in saving relatively significant on-chip memory and corresponding memory access during frame-based processing of the multimedia data. In an embodiment, the processing module 604 may identify the coding mode of a block for example, a CU coded in skip-mode, merely by observing the skip flag associated with the block. In an embodiment, based on the observation of the skip flag, the processing module may disable the computations associated with the de-blocking filtering of the internal edges associated with that block, thereby avoiding a complex computation associated with the determination of a BS parameter for de-blocking filtering. The reduction in computation also facilitates in relatively significant power savings in the system.

Figure 7:
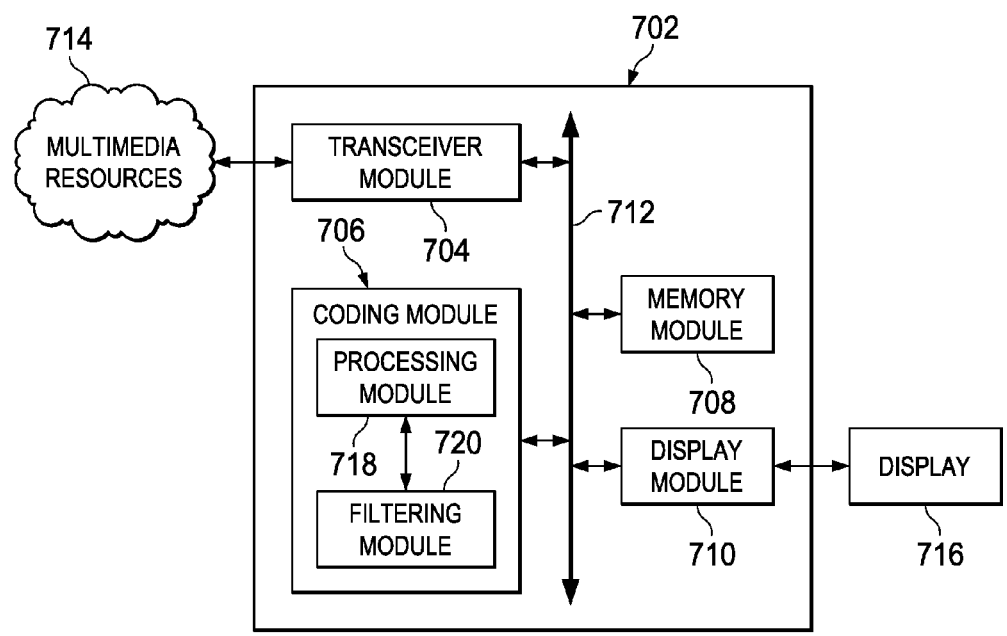
FIG. 7 is a block diagram of an exemplary integrated circuit (IC) configured to reduce blocking artifacts from multimedia data in accordance with an embodiment.

FIG. 7 is a block diagram of an integrated circuit 702 configured to remove blocking artifacts from block-coded multimedia data according to an embodiment. The integrated circuit 702 comprises a transceiver module 704, a coding module 706, a memory module 708 and a display module 710. The transceiver module 704, the multimedia processing module 706, the memory module 708 and the display module 708 are communicatively associated or coupled with each other using data path 712. Herein, it should be appreciated that at least some of the components described below in connection with the integrated circuit 700 may be optional and thus in an example embodiment may include more, less or different components than those described in connection with the example embodiment of FIG. 7.

The transceiver module 704 is communicatively associated or coupled with a plurality of multimedia resources 714 and is configured to receive multimedia data from one or more multimedia resources from among the plurality of multimedia resources 714. Examples of the multimedia resources may include, but are not limited to (1) remote multimedia systems, (2) media capture devices such as a camera, camcorders and the like, and (3) multimedia storage devices such as magnetic tapes, disks, computer-readable media and the like. In an embodiment, the transceiver module 704 may include an antenna and/or network connectors configured to connect to wired networks (for example, local area networks (LANs)) and wireless networks (for example, cellular networks), or a combination thereof (for example, the Internet). Examples of network connectors may include a universal serial bus (USB) interface, a wireless LAN interface, an infrared interface, an Ethernet port and the like.

The coding module 706 is configured to perform at least one of encoding multimedia data and decoding multimedia data. In an embodiment, the transceiver module 704 may be configured to receive the multimedia data in encoded form and provide the encoded multimedia data to the coding module 706. The coding module 706 may be configured to decode the encoded multimedia data and provide the decoded multimedia media to the memory module 708 for storage or to the display module 710 in order to display multimedia media on a display 716. In an embodiment, the coding module 706 may be configured to encode the video data and provide the video data to transceiver module 704 for transmission purposes or to memory module 708 for storage purposes.

In an embodiment, the coding module 706 may be configured to include components such as the processing module 718 and the filtering module 720, which may be substantially similar to processing module 602 and the filtering module 604, respectively, of system 600 of FIG. 6. In an embodiment, the coding module 706 may include an encoding module 718 and a blocking artifacts reduction module 720 communicatively associated or coupled with the encoding module 718. The components within the coding module 706 are configured to perform functions of respective components as discussed in FIG. 6, which are not repeated herein for the sake of brevity.

The memory module 708 is configured to store the multimedia data subsequent to one of the encoding of multimedia data and the decoding of the encoded multimedia data. The memory module 708 may be further configured to store the information associated with the mode of the blocks. For example, the memory module 708 may store one bit of information ascertaining the encoding mode of the block as a skip-mode. In an embodiment, the memory module 708 is configured to store the multimedia data subsequent to the reduction of the blocking artifacts from the block-coded multimedia data. Examples of memory module 708 may include, but are not limited to, random access memory (RAM), dual port RAM, synchronous dynamic RAM (SDRAM), double data rate SDRAM (DDR SDRAM), and the like. The display module 710 is configured to facilitate a display of the de-blocked multimedia data on display 716. The display may be facilitated, for example, in response to a user input received using a user interface (not shown in FIG. 7). Examples of display 716 may include a light crystal display (LCD) panel, a plasma display panel, a field emission display and the like.

In an embodiment the integrated circuit 702 may be an application processor chip. In an embodiment, the integrated circuit 702 may be a part of general processor chip embedded within a multimedia system. Examples of the multimedia systems may include, but are not limited to, (1) multimedia devices, such as cellular phones, digital video cameras and digital camcorders; (2) data processing devices, such as personal computers, laptops and personal digital assistants; and (3) consumer electronics, such as set top boxes, digital video disk (DVD) players and video network servers.

Without in any way limiting the scope, interpretation, or application of the claims appearing below, advantages of one or more of the exemplary embodiments disclosed herein include reducing blocking artifacts from the multimedia data based on a determination of a coding mode of blocks enclosing an edge. In particular, when the coding mode associated with the pair of adjacent blocks is determined to be a skip-mode, the de-blocking filtering of the edge disposed in-between the pair of adjacent blocks is disabled. Also, when it is determined that at least one of the blocks is coded in the skip-mode, then the de-blocking filtering of the internal edges associated with the at least one block is also disabled. The disabling of the de-blocking filtering for such edges improves the system performance since the computation involved in determining the BS parameter for such edges and de-blocking filtering such edges based on the BS parameter involves a relatively significant memory allocation. With the reduction in the memory allocation and computations involved, the power consumption of the system is greatly reduced, thereby increasing an overall performance of the system.

Although the present technology has been described with reference to specific exemplary embodiments, it is noted that various modifications and changes may be made to these embodiments without departing from the broad spirit and scope of the present technology. For example, the various systems, modules, etc., described herein may be enabled and operated using hardware circuitry (e.g., complementary metal oxide semiconductor (CMOS) based logic circuitry), firmware, software and/or any combination of hardware, firmware, and/or software (e.g., embodied in a machine readable medium). For example, the various modules and methods may be embodied using transistors, logic gates, and electrical circuits (e.g., application specific integrated circuit (ASIC) circuitry and/or in Digital Signal Processor (DSP) circuitry). Particularly, the system 600 of FIG. 6, which comprises the processing module 602 and the filtering module 604, may be enabled using software and/or using transistors, logic gates, and electrical circuits (e.g., integrated circuit circuitry such as ASIC circuitry).

Embodiments of the present disclosure include one or more computer programs stored or otherwise embodied on a computer-readable medium, wherein the computer programs are configured to cause a processor to perform one or more operations, such as, for example, operations 402-406 for method 400 or operations 502-528 for method 500. A computer-readable medium storing, embodying, or encoded with a computer program, or similar language, may be embodied as a tangible data storage device storing one or more software programs that are configured to cause a processor to perform one or more operations. Such operations may be, for example, any of the steps or operations described herein. Additionally, a tangible data storage device may be embodied as one or more volatile memory devices, one or more non-volatile memory devices, and/or a combination of one or more volatile memory devices and non-volatile memory devices.

Also, techniques, subsystems and methods described and illustrated in the various embodiments as discrete or separate may be combined or integrated with other systems, modules, techniques, or methods without departing from the scope of the present technology. Other items shown or discussed as directly communicatively associated, coupled or communicating with each other may be communicatively associated or coupled with one another through some interface or device, such that the items may no longer be considered directly communicatively associated or coupled with each other but may still be indirectly communicatively associated, coupled and/or in communication, whether electrically, mechanically, or otherwise, with one another. Other examples of changes, substitutions, and alterations ascertainable by one skilled in the art, upon studying the exemplary embodiments disclosed herein, may be made without departing from the spirit and scope of the present technology.

It should be noted that reference throughout this specification to features, advantages, or similar language does not imply that all of the features and advantages should be or are in any single embodiment. Rather, language referring to the features and advantages may be understood to mean that a specific feature, advantage, or characteristic described in connection with an embodiment may be included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions may be apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method of reducing blocking artifacts, the method comprising:
receiving a pair of adjacent blocks having an edge being positioned between the adjacent blocks, each of the blocks in the pair of adjacent blocks belonging to a respective one of a plurality of coding units, each of the coding units including coding information associated with coding of the respective coding unit;
determining, with one or more processors, whether both of the blocks in the pair of adjacent blocks belong to respective coding units that are coded in a skip-mode based on the coding information, wherein quantized coefficients are not transmitted for blocks coded in the skip-mode;
disabling, with the one or more processors, de-blocking filtering of the edge in response to determining that both of the blocks in the pair of adjacent blocks belong to respective coding units that are coded in the skip-mode;
enabling, with the one or more processors, de-blocking filtering of the edge in response to determining that at least one of the blocks in the pair of adjacent blocks does not belong to a coding unit that is coded in the skip-mode;

determining, with the one or more processors, that one of the adjacent blocks belongs to a coding unit that is coded in the skip-mode; and enabling, with the one or more processors, the de-blocking filtering of the edge in response to determining that the one of the adjacent blocks belongs to a coding unit that is coded in the skip-mode.

2. The method of claim 1, wherein disabling the de-blocking filtering of the edge comprises:

assigning a zero value to a boundary strength (BS) parameter associated with the edge.

3. The method of claim 1, wherein enabling de-blocking filtering of the edge comprises:

determining coding parameters respectively associated with the pair of adjacent blocks; and assigning a value to a boundary strength (BS) parameter associated with the edge based on the coding parameters.

4. The method of claim 3, wherein the coding parameters comprise at least one of residual data, motion estimation data and data associated with one or more reference pictures corresponding to the pair of adjacent blocks.

5. The method of claim 1, wherein the edge is one of a horizontal edge and a vertical edge.

6. The method as claimed in claim 1, wherein each of the blocks of the pair of adjacent blocks includes at least one of a transform block and a prediction block.

7. The method of claim 1, further comprising;

determining that at least one block from among the pair of the blocks is associated with a coding unit coded in the skip-mode; and disabling de-blocking filtering of a plurality of internal edges associated with the coding unit based on the determination.

8. The method of claim 1, wherein a coding unit is coded without applying a transform to the coding unit when the coding unit is coded in the skip-mode.

9. A system configured to reduce blocking artifacts, the system comprising:

one or more circuits configured to:

receive a pair of adjacent blocks having an edge being positioned between the adjacent blocks, a first block in the pair of adjacent blocks belonging to a first coding unit of a plurality of coding units, a second block in the pair of adjacent blocks belong to a second coding unit of the plurality of coding units, each of the coding units including coding information associated with coding of the respective coding unit;

determine whether both of the first and second blocks in the pair of adjacent blocks belong to respective coding units that are coded in a skip-mode based on the coding information, wherein quantized coefficients are not transmitted for blocks coded in the skip-mode;

disable de-blocking filtering of the edge in response to determining that both of the first and second blocks in the pair of adjacent blocks belong to respective coding units that are coded in the skip-mode;

enable de-blocking filtering of the edge in response to determining that at least one of the first and second blocks in the pair of adjacent blocks does not belong to a coding unit that is coded in the skip-mode;

determine that one of the adjacent blocks belongs to a coding unit that is coded in the skip-mode; and enable de-blocking filtering of the edge in response to determining that the one of the adjacent blocks belongs to a coding unit that is coded in the skip-mode.

10. The system of claim 9, wherein the circuits are further configured to disable de-blocking filtering of the edge by assigning a zero value to a boundary strength (BS) parameter associated with the edge.

11. The system of claim 9, wherein the circuits are further configured to enable de-blocking filtering of the edge by:

determining coding parameters associated with the pair of adjacent blocks, respectively; and assigning a value to a boundary strength (BS) parameter associated with the edge based on the coding parameters.

12. The system of claim 11, wherein the coding parameters comprise at least one of residual data, motion estimation data and data associated with one or more reference pictures corresponding to the pair of adjacent blocks.

13. The system of claim 9, wherein the edge is one of a horizontal edge and a vertical edge.

14. The system as claimed in claim 9, wherein each of the blocks of the pair of adjacent blocks includes at least one of a transform block and a prediction block.

15. The system of claim 9, wherein the circuits are further configured to determine whether at least one block from among the pair of adjacent blocks is associated with a coding unit coded in the skip-mode.

16. The system of claim 15, wherein the circuits are further configured to disable de-blocking filtering of a plurality of internal edges associated with the coding unit in response to determining that the at least one block is associated with the coding unit coded in the skip-mode.

17. The system of claim 9, wherein the system is one of an H.264 encoder, a high efficiency video coding (HEVC) based encoder, a moving picture experts group (MPEG)-1 based encoder, an MPEG-2 based encoder and an MPEG-4 based encoder.

18. The system of claim 9, wherein the system is one of an H.264 based decoder, a high efficiency video coding (HEVC) based decoder, a moving picture experts group (MPEG-1) based decoder, an MPEG-2 based decoder and an MPEG-4 based decoder.

19. The system of claim 9, wherein a coding unit is coded without applying a transform to the coding unit when the coding unit is coded in the skip-mode.

20. An integrated circuit comprising:

a coding module configured to perform at least one of encoding of video data and decoding of encoded video data, the coding module comprising:

a processing module configured to:

receive a pair of adjacent blocks having an edge being positioned between the adjacent blocks, a first block in the pair of adjacent blocks belonging to a first coding unit of a plurality of coding units, a second block in the pair of adjacent blocks belong to a second coding unit of the plurality of coding units, each of coding units including coding information associated with coding of the respective coding unit;

determine whether both of the blocks in the pair of adjacent blocks belong to respective coding units that are coded in a skip-mode based on the coding information, wherein quantized coefficients are not transmitted for blocks coded in the skip-mode;

disable de-blocking filtering of the edge in response to determining that both of the blocks in the pair of adjacent blocks belong to respective coding units that are coded in the skip-mode;
enable de-blocking filtering of the edge in response to determining that at least one of the blocks in the pair of adjacent blocks does not belong to a coding unit that is coded in the skip-mode;
determine that one of the adjacent blocks belongs to a coding unit that is coded in the skip-mode; and
enable de-blocking filtering of the edge in response to determining that the one of the adjacent blocks belongs to a coding unit that is coded in the skip-mode; and
a memory module communicatively associated with the coding module, the memory module configured to store the video data subsequent to one of an encoding of the video data and a decoding of the video data.

21. The integrated circuit of claim 20, wherein the processing module is further configured to determine whether at least one block from among the pair of adjacent blocks is associated with a coding unit coded in the skip-mode.

22. The integrated circuit of claim 21, wherein the processing module is further configured to disable de-blocking filtering of a plurality of internal edges associated with the coding unit in response to determining that the at least one block is associated with the coding unit coded in the skip-mode.

23. The integrated circuit of claim 20, wherein a coding unit is coded without applying a transform to the coding unit when the coding unit is coded in the skip-mode.

24. A device comprising circuitry configured to:
disable de-blocking filtering of an edge of a pair of adjacent blocks that belong to different coding units in response to determining that both of the blocks in the pair of adjacent blocks belong to respective coding units that are coded in a skip-mode, wherein quantized coefficients are not transmitted for blocks coded in the skip-mode;
enable de-blocking filtering of the edge in response to determining that at least one of the blocks in the pair of adjacent blocks does not belong to a coding unit that is coded in the skip-mode;
determine that one of the adjacent blocks belongs to a coding unit that is coded in the skip-mode; and
enable de-blocking filtering of the edge in response to determining that the one of the adjacent blocks belongs to a coding unit that is coded in the skip-mode.

25. The device of claim 24,
wherein a transform is not applied to a coding unit that is coded in the skip-mode, and the transform is applied to a coding unit that is not coded in the skip-mode.

\* \* \* \* \*